United States Patent Office 3,100,761
Patented Aug. 13, 1963

3,100,761
POLYMERIZATION PROCESS WITH A CATALYST SYSTEM OF METAL HALIDE AND ORGANO-MAGNESIUM COMPOUND
Robert P. Fellman, Levittown, William E. Goode, Yardley, and Frederick H. Owens, Croydon, Pa., assignors to Rohm & Haas Company, Philadelphia, Pa., a corporation of Delaware
No Drawing. Filed July 24, 1958, Ser. No. 750,563
15 Claims. (Cl. 260—88.7)

This invention concerns a process for polymerizing esters of acrylic or methacrylic acid, acrylonitrile, and methacrylonitrile. According to this process, boron trifluoride or a chloride, bromide, or iodide of specific metals is mixed with monomer to be polymerized, whereby a complex of said fluoride or a said chloride, bromide, or iodide and a monomer is formed, and the monomer carrying the complex is polymerized in inert organic solvent under the influence of an organo magnesium compound.

It was found by Lebedeva and Vaynrub (J. Gen. Chem. 22, 1974), that methyl methacrylate and isopropylmagnesium bromide react to lead to the dimethyl ester of $\alpha,\alpha'$-dimethyl-$\alpha$-isobutylglutaric acid. Apparently such Grignard reagents add 1,4 to the starting ester followed by addition of the product to a second molecule of this ester. When the organo magnesium complex is decomposed, as with water, the final dimethyl ester is formed. These authors later reported that methyl acrylate reacts with isopropylmagnesium bromide to give dimethyl $\alpha$-isobutylglutarate. On the other hand, methyl methacrylate and methylmagnesium bromide reacted to give a mixture of dimethylisopropenylcarbinol and methyl sec-butyl ketone, such products depending upon 1,2-addition.

Furthermore, Landler reported that, when he treated methyl methacrylate with butylmagnesium bromide, there was a small amount formed of some polymeric material of low molecular weight of the order of 10,000 to 20,000.

Attempts on our part to polymerize methyl methacrylate and other acrylic esters with Grignard reagents showed that sometimes addition polymers could be obtained and at other times they did not form. Even when polymers resulted, they were of low molecular weight and had no apparent utility. Thus, results were variable and uncertain.

Processes have been proposed for polymerizing olefins in which the polymerization catalysts are formed by reacting an organometallic compound and a salt of a transition metal. For example, in Belgian Patent 533,362, the catalysts used are formed from an organo aluminum compound and a salt of a metal from periodic groups IV to VI, while in Belgian Patent 534,888, reaction products of organo magnesium or zinc compounds and salts of metals of groups IV to VI are used as catalysts. Metal salts from group VIII may be used in the same way. These catalysts are primarily heterogeneous, for the reaction of organo metallic compounds and such salts generally gives a solid. This may be formed or held in suspension or it may be separated. Thus, in this type of catalysis, it is necessary to deal with heterogeneous catalysis and with the difficulties ensuing therefrom. Application of the above systems to methyl methacrylate and other acrylic esters can bring about polymerization as might be expected, but results are variable and difficult to control, as might also be expected from the nature of the catalysts. Conversions are low. Molecular weights tend to be low and variable. Separation of such catalysts has proved to be a most serious problem and the presence of catalyst in polymer may seriously interfere with properties. Whether stereospecificity develops in the polymers from such esters appears to depend more upon the total system than upon the catatlyst formed by reacting organometallic compound and salt of transition element. Such disadvantages of the systems of the art are avoided in the process of the present invention.

By the process of this invention, polymerization of esters of acrylic and methacrylic acid and of acrylonitrile or methacrylonitrile is effected with organo magnesium compounds as polymerization initiators to give useful polymers of controlled molecular weights with certainty and with uniformity of results. Since these compounds act anionically, they avoid the effects and side reactions which are sometimes troublesome from the use of peroxidic initiators. Furthermore, many of the polymers produced by the process of this invention possess properties which differ from those obtained in other ways, particularly from those of free-radically polymerized products, or of polymers formed with the above-noted heterocatalysts. In some cases, the process of this invention has surprising and useful stereospecific effects. The process is surprisingly effective and yields clear polymers which produce no turbidity in solutions.

It is known that Grignard reagents can be formed not only from reacting an organic chloride or bromide with magnesium in ether, but also by adding magnesium chloride or bromide to a dihydrocarbon magnesium compound.

We have found great differences which depend upon whether one of the metal halides as herein defined is added to the monomer or to the organo-magnesium compound. It is known that a diarylmagnesium or dialkylmagnesium reacts with magnesium chloride or bromide to give corresponding Grignard reagents. It is of interest to note that di-hydrocarbon magnesium compounds often fail to initiate polymerization and are variable in their actions on acrylic esters. Their action, however, is not improved or made more certain by direct reaction with magnesium chloride or bromide. Nor is the action of Grignard reagents improved by addition thereto of magnesium chloride or bromide.

In fact, there are specific salts which form complexes with the designated monomers and then polymerization is greatly improved under initiation with organo-magnesium compounds. Yet these same salts, when added directly to the organo-magnesium compounds destroy initiator action. This situation is in sharp contrast with the preparation of initiators used, for example, for polymerization of $\alpha$-olefins.

Yet it has been found that when a chloride, bromide, or iodide of beryllium, magnesium, calcium, strontium, barium, zinc, cadmium, or aluminum or boron trifluoride is dissolved in monomer, whereby a complex is formed, controlled polymerization of monomer can then be initiated with an organo-magnesium compound.

Effective organo-magnesium compounds may be represented by the formula

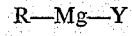

R—Mg—Y where R is alkyl, cycloalkyl, aralkyl, aryl, alkoxyaryl, alkenyl, aralkenyl or alkynyl, and Y represents chlorine, bromine, iodine, or a group defined by R. Iodine is less useful as Y than are chlorine and bromine. Preferably, the alkyl groups have two to twelve carbon atoms, although larger alkyl groups may be used, and the alkyl groups are primary or secodary, including such typical groups as ethyl, propyl, isopropyl, butyl, isobutyl, sec-butyl, amyl, isoamyl, sec-amyl, neopentyl, 2-ethylbutyl, heptyl, 2-ethylhexyl, octyl, nonyl, decyl, or dodecyl. The cycloalkyl groups may be simple cyclopentyl or cyclohexyl or hydrocarbon-substituted cycloalkyl groups, such as methylcyclopentyl, methylcyclohexyl, butylcyclohexyl, octylcyclohexyl, or cyclohexylcyclohexyl. The various other cyclic groups that may go along with these alicyclic groups include dicyclopentanyl, menthyl, or isobornyl.

A variety of useful groups comes within the aralkyl designation, including benzyl, α-methylbenzyl, methylbenzyl, dimethylbenzyl, butylbenzyl, phenylbenzyl, diphenylmethyl, triphenylmethyl, fluorenyl, or naphthylmethyl.

Aryl groups are frequently used in organo-magnesium compounds. They include the simple phenyl group and alkylphenyl groups, such as tolyl, xylyl, ethylphenyl, butylphenyl, diamylphenyl, tert-octylphenyl, or methyl-tert-octylphenyl. Such groups as methoxyphenyl, ethoxyphenyl, or butoxyphenyl are likewise of interest. Other typical useful substituted phenyl groups are cyclohexyl phenyl, biphenyl, and naphthyl.

Also effective are unsaturated hydrocarbon groups, whether ethylenically or acetylenically unsaturated, such as allyl, crotyl, undecenyl, dodecenyl, ethynyl, butynyl, hexynyl, phenylethynyl, or cinnamyl.

As is well known, Grignard reagents are available through reaction of organic halides and magnesium. Simple groups on the magnesium may be replaced by other groups, as for example,

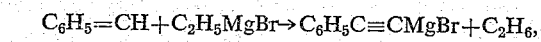

or

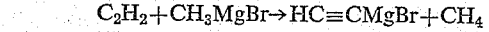

or

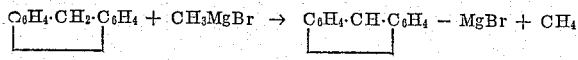

The di-hydrocarbon magnesiums are also known and any of the above groups may occur in these. While it has been said that RMgX compounds, where X is chlorine or bromine, and R₂Mg compounds show about the same reactions and differ essentially only in rates of reaction, these two kinds of organo-magnesium compounds by themselves may have quite different actions in polymerization. Yet they both provide the same sort of polymerizations when a complex of monomer and a defined salt is first formed and used in the polymerization.

Examples of specific magnesium compounds are di-ethyl-, dibutyl-, dioctyl-, didodecyl-, dibenzyl-, dicyclohexyl-, diallyl-, di-1-hexynyl-, diphenyl-, ditolyl-, or di(biphenyl)magnesiums and chlorides, bromides, or iodides of ethylmagnesium, butylmagnesium, hexylmagnesium, 1-hexynylmagnesium or phenylethynylmagnesium, 2-ethylhexylmagnesium, n-octylmagnesium, dodecylmagnesium, benzylmagnesium, butylbenzylmagnesium, cyclopentylmagnesium, cyclohexylmagnesium, phenylmagnesium, biphenylmagnesium, diphenylmethylmagnesium, triphenylmethylmagnesium, fluoroenylmagnesium, octylphenylmagnesium, allylmagnesium, or Grignard reagents in which the organic group contains a heteroatom as 2-pyridinylmagnesium bromide, 4-trifluoromethylphenylmagnesium bromide.

The presence of an inert organic solvent at least for the monomer is highly desirable. In the absence of such solvent polymer forms around initiator and polymerization may fail to proceed. The solvent may be one which primarily dissolves the monomer, or it may be one which dissolves both monomer and polymer. By inert solvent is here meant one which does not react with the magnesium compound under conditions of polymerization. The types of organic compounds which thus react and those which do not are well known. Useful solvents include aromatic hydrocarbons, such as benzene, toluene, xylene, and aromatic naphthas or distillates, petroleum distillates of which petroleum ethers, n-heptane, n-octane, and solvent naphthas are typical examples, chlorinated hydrocarbons such as dichloroethane, trichloroethane, polychloropropanes, methylene dichloride, and carbon tetrachloride, and dry ethers, such as diethyl ether, dibutyl ether, the dimethyl or diethyl ethers of ethylene glycol, tetrahydrofuran or tetrahydropyran. The solvent or mixture of solvents should be selected to maintain the reaction mixture liquid at the temperature of polymerization.

The monomers which can be used in the process of this invention are acrylic or methacrylic esters or nitrile, i.e., acrylonitrile and methacrylonitrile. These can form a complex with the salt added thereto. The alcohol residues forming the esters are those free from functional groups which can react in the Zerewitinoff test. They comprise alkyl, alkenyl, alicyclic, including cycloalkyl and terpenyl groups, aralkyl, aryl, comparable groups having one or more ether linkages, and tertiary amino-substituted groups. More specifically useful alcohol residues forming acrylic esters are methyl, ethyl, propyl, isopropyl, butyl, isobutyl, sec-butyl, tert-butyl, hexyl, octyl, nonyl, dodecyl, cetyl, stearyl, and higher alkyl groups, allyl, methallyl, crotyl, undecenyl, dodecenyl, and oleyl, cyclopentyl, cyclohexyl, methylcyclohexyl, butylcyclohexyl, cyclohexenyl, benzyl, phenylethyl, phenylpropyl, butylbenzyl, cyclopentyl, dicyclopentyl, dicyclopentanyl, isobornyl, terpenyl, phenyl, xylyl, tolyl, butylphenyl, methoxyethyl, ethylthioethyl, ethoxyethoxyethyl, ethoxypropyl, ethoxypropoxyethyl, benzoxyethyl, cyclohexoxyethyl, phenoxyethyl, phenoxyethoxyethyl, octoxypropyl, octoxybutyl, dimethylaminoethyl, diethylaminoethyl, dimethylaminopropyl, morpholinoethyl, piperidinoethyl, pyrrolidinoethyl, thenyl, or tetrahydrofurfuryl.

The acid portion of the ester may be from acrylic acid, methacrylic acid, or a thiolacrylic acid.

While usually a single monomer is polymerized, there may also be formed copolymers from two or more esters of acrylic acid or from two or more esters of methacrylic acid with the proviso that the comonomers used in each class are quite similar in their rates of polymerization.

It has also been found that vinyl sulfones can be polymerized in the same way and amides which have two unreactive N-substituents.

The proportion of monomer to solvent may vary from one percent or less up to about 50% of the resulting mixture. Sufficient solvent should be present to maintain the polymerizing mixture in a mobile, fluid state.

The ratio of initiator to monomer may be considerably varied. It depends in part upon the choice of organo-magnesium compound, upon the choice of metal halide, upon the monomer to be polymerized, and also upon the molecular weight desired for the polymer. In the lower range of ratios of initiator to monomer, relatively higher molecular weights are obtained. Practical difficulties determine the minimum ratios, since traces of moisture or chance admission of air into the reaction vessel may consume initiator. Even so, polymers of high molecular weight form, but in reduced conversions.

The practical limits of organo-magnesium compound are between about 0.1 and 10 mole percent based on the total monomer. The preferred range is from 1 to 5 mole percent.

The amount of a salt which is complexed with monomer depends in part upon the amount of organo-magnesium compound used. The ratio of salt to said compound may vary from about 0.5 mole of salt per mole of said compound up to about 2 moles per mole. The optimum ratios will depend upon monomer, choice of initiator, and the kind of polymer desired, including its molecular weight.

It has been found that the above defined salts form complexes with the above defined monomers. While monomer is present in a polymerizing system in excess of such salt, the complex nevertheless exists and it has been possible to prepare and isolate typical complexes. These can be demonstrated by shifts in the infrared absorption spectra and by separation and analysis of product. The use of these complexes leads to higher conversions and/or higher molecular weights than when the initiators are used alone.

It is essential that complex be formed with the monomer before initiator be mixed with the system. If desired, a defined metal halide and at least sufficient monomer to provide the complex may be first mixed, then this mixture is combined with the organo-magnesium compound, and the resulting mixture is mixed with more monomer. Alternatively, all of the monomer and defined metal salt are mixed together and this mixture and organo-magnesium compound are combined. Solvent is supplied before the complex, initiating organo-magnesium compound, and monomer are combined so that polymerization occurs in the presence of solvent. The order of mixing complex, initiator, and monomer is not critical.

Polymerizations are carried out within the general range of about −90° C. to about 50° C. The temperatures used will depend upon the initiator system, the monomer, the solvent, the desired nature of the polymer, including molecular weight, molcular weight distribution, branching, and other factors.

In the range of temperature above about 40° C. there is a tendency for the polymers to become branched. At the lowest temperatures, conversions may be low in a given time. A preferred temperature range is from −80° C. to about 0° C., for in this range, side reactions are at a minimum, branching of the polymer chain is avoided, and the molecular size can be well controlled and in general reproduced.

The polymerization reaction is best carried out in an inert atmosphere and preferably in the substantial absence of moisture. While dry, oxygen-free nitrogen is commonly used, an inert atmosphere may also be supplied by helium, argon, methane, or hydrogen.

It will be realized that both oxygen and moisture react with organo-magnesium compounds and the amount of these present or introduced must be less than equivalent to the amount of such compounds. Desirably, oxygen and/or moisture should be less than ten mole percent with reference to the organo-magnesium compound used.

Polymer may be obtained in a crude form as the non-volatile residue on evaporation of solvent and monomer by heating under reduced pressure. When the polymer is formed in a solvent for both monomer and polymer, polymer can be separated by precipitating polymer with a non-solvent. For example, a benzene solution of polymer may be mixed with methanol. The polymer precipitating may be separated, washed, and dried. If a solvent only for the monomer is used during polymerization, polymer separates as formed. It can be washed and dried if so desired.

Any salts or magnesium compounds in the polymers can be removed by treating precipitated polymer with an acid solution. Also, the polymer may be redissolved in a solvent and precipitated from the solution by mixing with a non-solvent.

The precipitated or powdered polymers are useful as molding powders. The firm to hard polymers may be mixed, as on rolls, with about 0.5% of a lubricant, such as stearic acid, and about 0.2% of a light stabilizer, such as salol, and the mixture granulated, if desired, being screened to remove fines and particles coarser than about 18 mesh (U.S. sieve series).

They may be dissolved in organic solvents to provide lacquers. They may be used as coatings for metal, wood, paper, cloth, leather, and the like and as adhesives and binders. This product is useful in injection molding. Optionally, the granulated mixture may be pelletized before molding.

In these applications advantage may be taken of the peculiar properties which are possessed by polymers formed under the influence of the initiator-complex system herein described and utilized. These properties include those imparted by stereo regularity, which may lead to two dimensional order or even to the three dimensional order which is characteristic of crystalline lattices.

In the illustrative examples which follow parts are by weight unless otherwise designated.

*Example 1*

One thousand parts by volume of anhydrous toluene are placed in a reaction vessel equipped with a mechanical stirrer, thermometer, additional funnel, and inlet and outlet tubes for nitrogen gas. One neck of the vessel is covered with a rubber serum bottle cap. Anhydrous, oxygen-free nitrogen is passed through the toluene for two hours to remove dissolved oxygen and to displace air from the apparatus. The reaction vessel is immersed in an ice bath, and 7.2 parts of a 2.82 M solution of diphenylmagnesium in diethyl ether is introduced by means of a hypodermic syringe inserted through the serum bottle cap. When the temperature of the reaction mixture reaches 3° C., an oxygen-free solution of 4.1 parts of magnesium bromide in 52.0 parts of methyl methacrylate is added during one-half minute. A vigorous, exothermic reaction occurs, and the temperature of the reaction mixture rises to 11° C. Stirring and cooling in the ice bath are continued for sixteen hours. Two parts of methanol are added to terminate the polymerization, and the viscous reaction mixture is poured into ten volumes of vigorously agitated low boiling petroleum ether. Solid polymer forms. It is separated, washed with petroleum ether, and dried. The dried polymer (47.5 parts) is purified by suspending it for three hours in a mixture of 90 parts of sulfuric acid, 300 parts of methanol, and 2700 parts of water. The slurry then is filtered, and the polymer is washed with de-ionized water and dried. There is obtained 42.6 parts of poly(methyl methacrylate) having an intrinsic viscosity in chloroform of 2.08 dl./g. This corresponds to a molecular weight of 625,000.

In a similar experiment, 7.36 parts of $MgBr_2$ are employed as a solution in 52 parts of methyl methacrylate in place of the above solution. Well regulated polymerization ensues. Thirty-six parts by a polymer, with a molecular weight of 220,000 is isolated. Similarly, use of only 1.84 parts of magnesium bromide in the same amount of methyl methacrylate produces 23.8 parts of polymer having a molecular weight of 380,000.

When this procedure is carried out at 40° C., essentially equivalent results are obtained.

By way of comparison, there may be mixed 7.2 parts of diphenylmagnesium and 7.36 parts of anhydrous magnesium bromide. This mixture is supplied to a toluene solution of 52 parts of methyl methacrylate. There is no evidence of any vigorous reaction. The mixture is warmed to 12° C. and stirred at 0° to 12° C. for 20 hours. The reaction mixture is worked up as above. A small amount of a low polymer is obtained. It has a molecular weight of less than 1000.

In place of diphenylmagnesium used above, there may be used with like effect a bis(alkylphenyl)magnesium. The alkyl group or groups may be methyl, ethyl, propyl, isopropyl, butyl, tert-butyl, or tert-octyl, by way of specific examples. The cyclohexylphenyl group may be used in exactly the same way and the biphenyl group is also useful and very effective. The same polymerization is obtained with bis(methoxyphenyl)magnesium or bis(ethoxyphenyl)magnesium. In every case for good, successful polymerization, the salt, here magnesium bromide, is separately complexed with the acrylic ester to be polymerized, and there are mixed organo-magnesium compound and the complex in monomer.

*Example 2*

To a reaction flask equipped as in Example 1, there is charged 1000 parts by volume of anhydrous toluene. The toluene is freed of dissolved oxygen by bubbling through it, for three hours, a stream of anhydrous oxygen-free nitrogen. The reaction vessel is immersed in an ice bath, and 7.5 parts by volume of a 2.82 M solution of diphenylmagnesium is added by means of a hypodermic syringe inserted through the serum bottle cap.

When the temperature of the reaction mixture reaches 2.5° C., there is added from the addition funnel 49.8 parts of a solution prepared by mixing 100 parts of methyl methacrylate and 5.3 parts of anhydrous aluminum chloride. The reaction mixture rapidly becomes very viscous, and the temperature rises to 11° C. After two and one-half hours, two parts of methanol are added to terminate the reaction. The polymer is precipitated by pouring the reaction mixture into 10 volumes of vigorously agitated low-boiling petroleum ether. The solid which separates is collected on a filter and dried under reduced pressure. This product is freed of inorganic impurities by suspending it for three hours in a mixture of 90 parts of concentrated sulfuric acid, 2700 parts of water, and 300 parts of methanol. The slurry then is filtered, and the solid is washed with water and dried. There is obtained 37.5 parts (78.1% yield) of poly(methyl methacrylate) having an intrinsic viscosity of 1.55 dl./g. in chloroform, corresponding to a viscosity average molecular weight of 430,000.

In a separate experiment it was found that the addition of aluminum chloride to the solution of diphenylmagnesium, without first forming the aluminum chloride-monomer complex, produces a mixture totally inactive as a polymerization initiator.

*Example 3*

To a reaction vessel equipped with a mechanical stirrer, addition funnel, thermometer, serum bottle cap, and a tube for admitting nitrogen is charged 1000 parts by volume of anhydrous, oxygen-free toluene. Nitrogen is bubbled through the toluene for two hours to remove dissolved oxygen and to displace air from the apparatus. The reaction flask is immersed in an ice bath, and 9.2 parts of a 2.17 M solution of diphenylmagnesium is introduced by means of a hypodermic syringe inserted through the serum bottle cap.

With the temperature of the reaction mixture at 2° C., a solution of 5.3 parts of anhydrous aluminum bromide in 50 parts of methyl methacrylate is added through the addition funnel. The temperature rises to 8° C. Stirring is continued for 18 hours, then the viscous mixture is poured slowly into 7 volumes of petroleum ether. The solid polymer is collected on a filter and dried under reduced pressure. Purification is accomplished by stirring for three hours in suspension in a mixture of 90 parts of de-ionized water. The polymer is isolated by filtration, and is washed with water and dried. There is obtained 30.6 parts (66.5% yield) of poly(methyl methacrylate) having an intrinsic viscosity (chloroform) of 1.34 dl./g. This corresponds to a viscosity average molecular weight of 360,000.

In an otherwise similar experiment, a solution of 4.1 parts of aluminum iodide in 50 parts of methyl methacrylate is added to the initiator solution. After isolation and purification there is obtained 38.7 parts (80.6%) of poly(methyl methacrylate) having a viscosity average molecular weight of 1,525,000.

Comparison experiments in which the aluminum bromide is mixed directly with the diphenylmagnesium solution and this mixture is added to the toluene solution of methyl methacrylate demonstrate that this mixture fails to initiate polymer formation. Likewise, a mixture of the aluminum iodide with the diphenylmagnesium fails to bring about polymerization.

*Example 4*

One thousand parts by volume of toluene are placed in a reaction vessel equipped as in Example 1, and the contents of the flask are cooled to 1° C. by immersion in an ice bath. Nitrogen is bubbled through the solvent, and 9.5 parts by volume of a 2.11 M solution of diphenylmagnesium is added under anaerobic conditions. Fifty parts of a methyl methacrylate solution prepared from 6 parts of anhydrous magnesium iodide and 50 parts of the monomer then is introduced from the addition funnel. The temperature rises rapidly to 9.5° C., then slowly subsides.

After eighteen hours 2 parts of methanol are added, and the reaction mixture is poured into 10 volumes of petroleum ether. The polymer is collected on a filter, dried, and washed with a mixture of sulfuric acid, water, and methanol as described in Example 1. There is obtained 37.8 parts of pure poly(methyl methacrylate) having a molecular weight of 168,000.

Here, for purposes of comparison, the magnesium iodide is mixed with the diphenylmagnesium solution and this mixture is added to the toluene solution of methyl methacrylate under the same conditions as above. No polymer is obtained.

*Example 5*

To a reaction flask equipped as described in Example 1 there is charged 1000 parts of anhydrous toluene. Nitrogen is bubbled through the solvent for two hours to remove dissolved oxygen and to purge the apparatus. The contents of the flask are cooled to −70° C. by immersion in a solid carbon dioxide-acetone bath, and 7.1 parts of a 2.3 M solution of dibutylmagnesium in diethyl ether are introduced.

There is added from the addition funnel a solution of 1.8 parts of freshly-fused zinc chloride in 57 parts of dry, oxygen-free methyl methacrylate. The temperature of the reaction mixture immediately rises to −66° C., and the viscosity increases markedly. After eighteeen hours the polymer is precipitated and washed as described in Example 1. Forty-six parts of poly(methyl methacrylate) having a viscosity average molecular weight of 198,000 are obtained.

In an otherwise similar experiment a solution of 5.4 parts of cadmium bromide in 50 parts of methyl methacrylate is added to the initiator solution. After washing and drying there is obtained 35 parts of poly(methyl methacrylate) having a viscosity average molecular weight of 37,000.

Again, for purposes of comparison, the same amount of cadmium bromide and dibutylmagnesium in solution are mixed and this mixture is applied to the methyl methacrylate solution as above. No polymer results.

Once again, for purposes of comparison, the same amounts of zinc chloride and dibutylmagnesium are mixed and this mixture is applied to the methyl methacrylate solution in toluene. No polymer can be found.

*Example 6*

One thousand parts by volume of anhydrous toluene are placed in a reaction vessel equipped as described in Example 1. Fifty parts of methyl methacrylate are added, and nitrogen is bubbled through the solution to remove dissolved oxygen and to purge the apparatus of air. Boron fluoride gas (1.36 parts) is added, and the mixture is cooled to 3° C. by immersing the flask in an ice bath.

Nine parts by volume of a 2.17 M solution of diphenylmagnesium in diethyl ether is introduced by means of a hypodermic syringe. The temperature of the reaction mixture immediately rises to 13° C., and there is a rapid increase in viscosity. After 1.25 hours, 2 parts of methanol are added, and the polymer is precipitated by pouring the viscous reaction mixture into 10 volumes of petroleum ether. The polymer is separated, dried, and purified by the washing procedure described in Example 1. There is obtained 40.4 parts of poly(methyl methacrylate) having an intrinsic viscosity of 2.13 dl./g. in chloroform, corresponding to a molecular weight of 650,000.

In place of gaseous boron fluoride, there may be used an equivalent amount of boron fluoride etherate. In such an experiment, there is obtained 37.0 parts of polymer having a molecular weight of 710,000.

In experiments for the sake of comparison, there are mixed the above quantities of boron trifluoride and diphenylmagnesium in solution. This mixture is added to the monomer solution and the above procedure is followed. No polymer results.

As shown above, essentially the same result is obtained whether boron fluoride itself is added directly to the monomer, or the boron trifluoride is first complexed. The etherate used above was formed by dissolving boron trifluoride in diethyl ether, the resulting solution being then added to the monomer.

Instead of diethyl ether as the substance to form a coordinated complex with boron trifluoride, there may be used other complexing substances which are free of reactive hydrogen (as may be determined in the Zerewitinoff test), and which do not consume all of the organo-magnesium compound to be added. Thus, there may be used to form complexes other ethers such as diisopropyl ether and di-n-butyl ether or methyl acetate, ethyl acetate, ethyl propionate, acetone, or methyl ethyl ketone.

*Example 7*

To a reaction vessel equipped as described in Example 1 is charged 1000 parts by volume of anhydrous n-heptane. Anhydrous, oxygen-free nitrogen is bubbled through the solvent for one hour, and the contents of the flask are cooled to —70° C. by immersion in a solid carbon dioxide-acetone bath. Seven parts of a solution of dibutylmagnesium (2.90 M) in diethyl ether is added, followed by a solution of 4.1 parts of anhydrous magnesium bromide in 50 parts of oxygen-free methyl methacrylate. The temperature rises to —65° C. and a finely divided white solid begins to separate.

After two hours the slurry is filtered, and the solid polymer is re-suspended in a mixture of 90 parts of sulfuric acid, 300 parts of methanol, and 2700 parts of de-ionized water. This suspension is stirred for three hours and then filtered. The solid poly(methyl methacrylate (43.7 parts)), possesses a viscosity average molecular weight of 186,000.

In place of n-heptane there may be used, with the same result, diethyl ether or 1,2-dimethoxyethane.

Instead of the addition of the magnesium bromide directly to the monomer, it is first added to the dibutylmagesium solution and the above procedure then followed. There is only a slight rise in temperature. Some polymer is separated, but the yield is less than obtained above, and the molecular weight of this polymer is considerably lower.

In place of the di-n-butylmagnesium used above, there may be substituted other dialkyl magnesiums from diethylmagnesium upwards. The larger dialkylmagnesiums have the advantage that they are less sensitive to traces of moisture than diethylmagnesium, dipropylmagnesium, or dibutylmagnesium, and are more soluble in paraffinic hydrocarbons which may be used as solvents.

*Example 8*

To a reaction flask equipped as in Example 1, there is charged 1000 parts by volume of anhydrous toluene. After flushing of the apparatus with nitrogen, the contents of the flask are cooled to 3.5° C. by means of an ice bath. With a hypodermic syringe, 15.1 parts by volume of a 1.32 M solution of phenylmagnesium bromide in diethyl ether is added, followed by a solution of 4.42 parts of anhydrous magnesium bromide in 55.4 parts of oxygen-free methyl methacrylate. A vigorous, exothermic reaction occurs, and the reaction mixture rapidly becomes extremely viscous.

The polymeric product is isolated by slowly pouring the reaction mixture into 10 volumes of petroleum ether. The solid which separates is collected on a filter, dried, and freed of inorganic impurities by the washing procedure described in Example 1. There is obtained 31.5 parts (70.5%) of poly(methyl methacrylate) having a viscosity average molecular weight of 690,000.

In a similar experiment, a mixture of 2.7 parts of aluminum chloride and 48 parts of methyl methacrylate is added to the Grignard solution. After purification of the product there is obtained 36.2 parts (75.4%) of polymer having an intrinsic viscosity in chloroform of 1.18 dl./g., corresponding to a molecular weight of 308,000.

The above quantities of the various materials are used, but for purposes of comparison, the magnesium bromide is mixed with the solution of phenylmagnesium bromide and the general procedure otherwise followed. The reaction mixture fails to become very viscous and only a small amount of polymer can be separated. It is of very low molecular weight.

When the aluminum chloride is mixed with the Grignard reagent and the mixture applied to the toluene solution of methyl methacrylate, no polymer can be obtained.

*Example 9*

One thousand parts by volume of anhydrous toluene are charged to an apparatus as described in Example 1. After flushing the equipment with nitrogen, the flask is immersed in a solid carbon dioxide-acetone bath. When the contents of the flask have reached a temperature of —70° C., 12.0 parts of a 2.40 M solution of n-butylmagnesium chloride in diethyl ether is added by means of a hypodermic syringe inserted through the serum bottle cap. From the addition funnel, a solution of 3.68 parts of anhydrous magnesium bromide in 100 parts of de-oxygenated methyl methacrylate is introduced. A rapid, exothermic polymerization occurs, and the temperature rises to —58° C. before subsiding. After sixteen hours, 2 parts of methanol are added to terminate active chain ends.

The polymer is isolated by pouring into 10 volumes of rapidly stirred petroleum ether. The solid product is separated and dried, and is purified by the washing procedure described in Example 1. There is obtained 84.2 parts of poly(methyl methacrylate) having a viscosity average molecular weight of 220,000.

*Example 10*

Two hundred parts by volume of toluene are placed in a flask equipped with a stirrer, addition funnel, thermometer, and inlet and outlet tubes for nitrogen. One neck of the flask is covered with a rubber serum bottle cap. Nitrogen is bubbled through the toluene for one hour, and 7.2 parts of a 2.82 M solution of diphenylmagnesium in diethyl ether is added by means of a hypodermic syringe.

The solution is cooled to 2° C. by immersion of the flask in an ice bath. A solution of 4.0 parts of magnesium bromide in 56 parts of isopropyl methacrylate is introduced from the addition funnel. A vigorous, exothermic reaction takes place, and the temperature of the reaction mixture rises to 25° C. before subsiding. A rapid increase in viscosity is noted. After one hour, 200 parts of methoxyethanol are added, and the insoluble material is removed by filtration. The filtrate is stripped of solvent under reduced pressure, and the residual solid is washed with de-ionized water and dried in a vacuum oven at 60° C. There is obtained 37.9 parts of poly(isopropyl methacrylate) having an intrinsic viscosity of 0.175 dl./g. in chloroform.

Instead of dissolving magnesium bromide in an acrylic ester, it may be dissolved or dispersed in an organic solvent such as an ether and the mixture with ether added to the acrylic ester.

*Example 11*

Twenty parts of stearyl methacrylate and 2 parts of anhydrous magnesium bromide are placed in a flask equipped with a stirrer, thermometer, and inlet and outlet tubes for nitrogen. One neck of the flask is covered with a rubber cap. Toluene (250 parts) is added, and the resulting solution is cooled to 3° C. One part of a 2.86 M solution of diphenylmagnesium in diethyl ether is introduced by means of a hypodermic syringe; the temperature of the reaction mixture rises to 6° C. before subsiding.

After sixteen hours, the viscous solution is poured into 10 volumes of methanol. The solid which separates is collected on a filter and dried. It is purified, by suspension, for two hours at room temperature in a mixture of 30 parts of concentrated sulfuric acid, 100 parts of methanol, and 900 parts of water. The dried polymer (16.7 parts, 83.5%) displays an intrinsic viscosity in benzene of 0.165 dl./g.

In a similar experiment, a solution of 2 parts of anhydrous magnesium bromide and 20 parts of stearyl methacrylate in 250 parts of purified n-octane is treated with 2 parts of 2.16 M solution of di-n-butylmagnesium in diethyl ether. A very viscous solution of poly(stearyl methacrylate) results.

*Example 12*

A mixture of 30 parts of benzyl methacrylate (B.P. 76–77° C. at 1.2 mm.), 3 parts of anhydrous magnesium bromide, and 300 parts of toluene is placed in an apparatus of the type described in Example 11. The apparatus is flushed with nitrogen and the contents are cooled to 3° C. by means of a solid carbon dioxide-acetone bath. A solution of 2.82 M diphenylmagnesium (7.2 parts by volume) is introduced by means of a hypodermic syringe. The temperature of the reaction mixture rises to 12° C. before subsiding. After sixteen hours, 2 parts of methanol are added to terminate the reaction, and the viscous solution is poured slowly into 10 volumes of methanol. The solid is freed of organic impurities by the washing procedure described in Example 11. There is obtained 21.7 parts of poly(benzyl methacrylate).

*Example 13*

In an experiment similar to that described in Example 1 a solution of 4.1 parts of magnesium bromide in 60 parts of oxygen-free dimethylaminoethyl methacrylate is added to one thousand parts by volume of anhydrous toluene containing 7.2 parts of 2.82 M solution of diphenylmagnesium in diethyl ether. A vigorous exothermic reaction occurs and the temperature of the reaction mixture rises rapidly to 9° C. Stirring and cooling in the ice bath are continued for 18 hours. Two parts of methanol are added to terminate the reaction, and the viscous reaction mixture is poured into 10 volumes of vigorously agitated petroleum ether. The polymer which separates is purified by dissolving in benzene and reprecipitating from petroleum ether. There is obtained 54 parts of poly(dimethylaminoethyl methacrylate).

In a similar experiment a 68% conversion of β-ethoxyethyl methacrylate to polymer is obtained.

*Example 14*

To a reaction flask equipped as in Example 1 there is charged 500 parts by volume of carefully purified tetrahydrofuran. Dry nitrogen is bubbled through the solvent for three hours to remove dissolved oxygen and to purge the apparatus of air. With the solvent at room temperature a solution of 3.25 parts by volume of a 2.82 M solution of diphenylmagnesium in diethyl ether is introduced by means of a hypodermic syringe. To the resulting solution is added 66 parts of n-butyl methacrylate containing 2.1 parts of anhydrous magnesium bromide. A vigorous reaction occurs and the temperature of the reaction mixture rises rapidly to 43° C. before subsiding again to room temperature. Stirring is continued at room temperature for 18 hours, then two parts of methanol are added to terminate the reaction.

The polymer is isolated by treating the reaction mixture with 10 volumes of petroleum ether in a Waring Blendor. The polymer that separates is collected on a filter and freed of inorganic impurities as described in Example 1. There is obtained 52 parts (78.7%) of poly(n-butyl methacrylate).

*Example 15*

To a flask equipped with a mechanical stirrer, thermometer, addition funnel, and inlet and outlet tubes for nitrogen is charged 680 parts by volume of anhydrous toluene. Dry, oxygen-free nitrogen is bubbled through the toluene for one hour to remove dissolved oxygen and to purge the apparatus of air. Seven and one-half parts by volume of a 2.82 M solution of diphenylmagnesium in diethyl ether is added, and the contents of the flask are cooled to —70° C. by immersion in a solid carbon dioxide-acetone bath.

A solution prepared from 285 parts of isopropyl acrylate and 7.9 parts of a 2.54 M solution of anhydrous magnesium bromide in diethyl ether is introduced from the addition funnel. An exothermic reaction occurs. After being stirred for 16 hours at —75° C. the reaction mixture is poured into 10 volumes of vigorously agitated petroleum ether. The polymer which separates is collected on a filter and dried in a vacuum desiccator. It is freed of inorganic impurities by suspending for two hours in a mixture of 90 parts of sulfuric acid, 300 parts of methanol, and 2700 parts of white, granular poly(isopropyl acrylate) having an intrinsic viscosity of 1.45 dl./g. in chloroform solution. This corresponds to a molecular weight of 550,000.

Substitution of 10.2 parts of a 2.3 M solution of magnesium iodide in diethyl ether for the magnesium bromide used above produced 194 parts of poly(isopropyl acrylate) of a viscosity average molecular weight of 420,000. Similarly, use of an equivalent amount of anhydrous magnesium chloride dissolved in the monomer provides a high conversion to poly(isopropyl acrylate) of 390,000 molecular weight.

In place of the toluene used above as the solvent, there may be used n-heptane of other paraffinic hydrocarbon. Equivalent conversions and molecular weights are obtained.

The above procedure is followed but the ratio of initiator to monomer is increased sixfold and the ratio of magnesium bromide is held about the same. The polymer thus obtained in about a 65% conversion has a molecular weight of 40,000. When the ratio of initiator to monomer is 2 mole percent, the resulting polymer has a molecular weight of about 85,000, while with ratios providing one mole percent and 0.25 mole percent, the products have a molecular weight of about 177,000 and 400,000 respectively.

*Example 16*

One thousand parts by volume of anhydrous toluene are placed in a reaction flask equipped as described in Example 1. Nitrogen is passed through the solvent for one hour to remove dissolved oxygen and to purge the apparatus. The contents of the reaction flask are cooled at —70° C. by immersion in a solid carbon dioxide-acetone bath and 7.5 parts by volume of a 2.82 M solution of diphenylmagnesium in diethyl ether is introduced. A solution of 2.7 parts of anhydrous aluminum chloride in 57 parts of isopropyl acrylate then is added. After 18 hours, 2 parts of methanol are introduced to terminate the reaction. The product is isolated by precipitation of the reacting mixture in 10 volumes of petroleum ether. After purification by the procedure described in Example 16, there is obtained 41 parts of pure poly(isopropyl acrylate) having a viscosity average molecular weight of 104,000.

In an exactly analogous experiment, a solution of 2.7 parts of anhydrous aluminum chloride in 73 parts of tert-butyl acrylate is added to a solution of diphenylmagnesium in anhydrous toluene at —70° C. After purification there is obtained 52.4 parts (71.8%) of poly(tert-butyl acrylate) having a viscosity average molecular weight of 130,000.

*Example 17*

To a reaction vessel equipped as described in Example 1 is added one thousand parts of anhydrous oxygen-free toluene. The flask is immersed in a solid carbon dioxide-acetone bath and 7.3 parts by volume of a 2.82 M solution of diphenylmagnesium in diethyl ether is introduced by means of a hypodermic syringe. With the contents of the flask at −60° C. there is added a solution of 1.36 parts of boron fluoride gas in 57 parts of isopropyl acrylate. A vigorous exothermic reaction occurs and the viscosity of the reaction mixture increases rapidly. Stirring at −60° C. is continued for 18 hours, then two parts of methanol are added to terminate the reaction.

The viscous reaction mixture is poured slowly into 10 volumes of petroleum ether. The polymer is separated and collected on a filter, dried, and freed of inorganic impurities by the procedure described in Example 16. There is obtained 36.5 parts (66.3%) of poly(isopropyl acrylate) having an intrinsic viscosity in benzene of 0.90 dl./g. This corresponds to a viscosity average molecular weight of approximately 300,000. Similarly, poly(isobutyl acrylate) is prepared in 74% conversion. This polymer possesses a viscosity average molecular weight of 360,000.

For purposes of comparison the above amounts of materials are used, but the boron trifluoride is added directly to the diphenylmagnesium solution and the mixture is used. No polymer is obtained.

*Example 18*

To a reaction vessel equipped as described in Example 1 is charged 1000 parts of anhydrous toluene. The solvent is freed of dissolved oxygen by bubbling nitrogen through it for one hour. Seven parts of a 2.82 M solution of diphenylmagnesium in diethyl ether is added, and the contents of the flask are cooled to −60° C. by immersion in a solid carbon dioxide-acetone bath. Forty-seven parts of de-oxygenated methyl acrylate containing 4.0 parts of anhydrous magnesium chloride are added rapidly. The temperature of the reaction mixture rises to −55° C. before subsiding.

After eighteen hours the viscous solution is poured slowly into 10 volumes of petroleum ether, and the rubbery polymer which separates is isolated and dried. There is obtained 19.7 parts of poly(methyl acrylate). The polymer is purified by dissolving in 200 parts of acetone and precipitating in 2000 parts of deionized water.

In an exactly analogous experiment, a 35% conversion of ethyl acrylate to polymer is obtained. Polymers of n-propyl acrylate and methyl thiol acrylate are produced in conversions of 46 and 73%, respectively, by polymerizations similar to that described above.

*Example 19*

To a reaction flask equipped as described in Example 1 there is charged 250 parts by volume of anhydrous toluene. Nitrogen is bubbled through the toluene for one hour to remove dissolved oxygen and to purge the apparatus of air, and 2.5 parts by volume of phenylmagnesium bromide is introduced by means of a hypodermic syringe inserted through a rubber cap covering one neck of the flask. The solution is cooled to −60° C. by immersing the flask in a solid carbon dioxide-acetone bath. A solution of 3.5 parts of anhydrous magnesium bromide in 34.5 parts of cyclohexyl acrylate is de-oxygenated with a stream of nitrogen, and then added rapidly from the addition funnel. The resulting solution is maintained at −60° C. for sixteen hours, during which time the viscosity increases markedly. The product is isolated by precipitation of the reaction mixture in 3500 parts of methanol. The solid which separates is collected on a filter, dried, and suspended in a mixture of 30 parts of concentrated sulfuric acid, 100 parts of methanol, and 300 parts of water. This slurry is stirred at room temperature for three hours and then filtered. The polymeric solid is washed with de-ionized water and dried in a vacuum desiccator. There is obtained 25.1 parts (72.8%) of poly(cyclohexyl acrylate) having an intrinsic viscosity in benzene of 0.48 dl./g. corresponding to a molecular weight of 182,500.

Poly (tert-butyl acrylate) having a molecular weight of 160,000 is obtained in a 43% conversion by an exactly analogous reaction. In another similar experiment, poly(isobornyl acrylate) of 210,000 molecular weight is obtained in 95% yield.

It has been observed that in the polymerization of esters of acrylic acid it is distinctly desirable to perform the polymerization between −20° and −90° C., since then side reactions, which are possible in the case of the esters of acrylic acid, are kept at a minimum.

*Example 20*

One thousand parts by volume of anhydrous toluene is placed in an apparatus of the type described in Example 1. Nitrogen is bubbled through the solvent for one hour to remove dissolved oxygen and to purge the apparatus. A 2.82 M solution of diphenylmagnesium in diethyl ether (11.3 parts by volume) is added by means of a hypodermic syringe and the contents of the flask are cooled to −60° C. by immersion in a solid carbon dioxide-acetone bath. To the cooled solution is added 53 parts of acrylonitrile containing 6.2 parts of anhydrous magnesium bromide. Stirring of the reaction mixture is continued for 18 hours. The reaction mixture is then poured into 10 volumes of vigorously agitated petroleum ether. The polymer which separates is collected on a filter, dried, and purified as described in Example 1. There is obtained 19.7 parts of polyacrylonitrile having an intrinsic viscosity of 0.117 dl./g. in dimethylformamide.

This identical reaction carried out at 3° C. produced 24.6 parts (46.4%) of polyacrylonitrile.

Repetition of the above procedure with substitution of an equivalent weight of methacrylonitrile likewise leads to useful polymers with molecular weight similar to those shown above.

By way of comparison the above amounts of diphenylmagnesium in diethyl ether and magnesium bromide are first mixed and this mixture is applied to the toluene solution of acrylonitrile. No polymer is obtained.

We claim:

1. A process for preparing a polymer from at least one monomer from the class consisting of acrylonitrile, methacrylonitrile, and esters of acrylic acid and of methacrylic acid and an alcohol, the non-hydroxyl portion of which is free of groups having reactive hydrogen as determined by the Zerewitinoff test, which comprises first mixing together under substantially anhydrous conditions and before organo-magnesium compound is introduced a said monomer and a member of the class consisting of boron trifluoride, beryllium chloride, beryllium bromide, beryllium iodide, magnesium chloride, magnesium bromide, magnesium iodide, calcium chloride, calcium bromide, calcium iodide, strontium chloride, strontium bromide, strontium iodide, barium chloride, barium bromide, barium iodide, zinc chloride, zinc bromide, zinc iodide, cadmium chloride, cadmium bromide, cadmium iodide, aluminum chloride, aluminum bromide, and aluminum iodide, the said member being mixed in a proportion of 0.5 to 2.0 moles thereof per mole of said monomer, whereby a preformed complex is formed from said member in said monomer, and then bringing together under substantially anhydrous and anaerobic conditions at a temperature from −90° C. to 50° C. and in admixture with an organic solvent inert to organo-magnesium compounds the monomer containing said preformed complex and 0.001 to 0.1 mole of an organo-magnesium compound per mole of said monomer, said organo-magnesium compound being of the formula

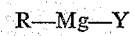

wherein R is one of the class consisting of alkyl, cycloalkyl, aralkyl, aryl, alkoxyaryl, alkenyl, aralkenyl, and alkynyl groups of at least two carbon atoms and Y is a member of the class consisting of chlorine, bromine, iodine, and a substituent defined by R, whereby monomer is converted to polymer.

2. A process for preparing a polymer from at least one monomer from the class consisting of acrylonitrile, methacrylonitrile, and esters of acrylic acid and of methacrylic acid and an alcohol, the non-hydroxyl portion of which is free of groups having reactive hydrogen as determined by the Zerewitinoff test, which comprises first mixing together under substantially anhydrous conditions and before organo-magnesium compound is introduced a said monomer and a member of the class consisting of boron trifluoride, beryllium chloride, beryllium bromide, beryllium iodide, magnesium chloride, magnesium bromide, magnesium iodide, calcium chloride, calcium bromide, calcium iodide, strontium chloride, strontium bromide, strontium iodide, barium chloride, barium bromide, barium iodide, zinc chloride, zinc bromide zinc iodide, cadmium chloride, cadmium bromide, cadmium iodide, aluminum chloride, aluminum bromide, and aluminum iodide, the said member being mixed in a proportion of 0.5 to 2.0 moles thereof per mole of said monomer, whereby a preformed complex is formed from said member in said monomer, and then mixing under substantially anhydrous and anaerobic conditions (1) the monomer containing said preformed complex, (2) an organic solvent inert to organo-magnesium compounds, and (3) 0.001 to 0.1 mole of an organo-magnesium initiator per mole of said monomer, holding the resulting mixture between −90° C. and 50° C. while polymer forms, and separating said polymer, the said organo-magnesium initiator being of the formula

wherein R is one of the class consisting of alkyl, cycloalkyl, aralkyl, aryl, alkoxyaryl, alkenyl, aralkenyl, and alkynyl groups of at least two carbon atoms and Y is a member of the class consisting of chlorine, bromine, iodine, and a substituent defined by R.

3. A process for preparing a polymer from at least one monomer from the class consisting of acrylonitrile, methacrylonitrile, and esters of acrylic acid and of methacrylic acid and an alcohol, the non-hydroxyl portion of which is free of groups having reactive hydrogen as determined by the Zerewitinoff test, which comprises first mixing together under substantially anhydrous conditions and before organo-magnesium compound is introduced a said monomer and a member of the class consisting of boron trifluoride, beryllium chloride, beryllium bromide, beryllium iodide, magnesium chloride, magnesium bromide, magnesium iodide, calcium chloride, calcium bromide, calcium iodide, strontium chloride, strontium bromide, strontium iodide, barium chloride, barium bromide, barium iodide, zinc chloride, zinc bromide, zinc iodide, cadmium chloride, calmium bromide, cadmium iodide, aluminum chloride, aluminum bromide, and aluminum iodide, the said member being mixed in a proportion of 0.5 mole to 2.0 moles per mole of said monomer, whereby a preformed complex is formed from said monomer in said monomer, then bringing together under substantially anhydrous and anaerobic conditions at a temperature from −90° C. to 50° C. and in admixture with an organic solvent which is inert to organo-magnesium compounds, the monomer containing said preformed complex and 0.01 to 0.05 mole of an organo-magnesium compound per mole of said monomer, whereby polymer is formed, and separating said polymer, said organo-magnesium compound being of the formula

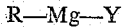

wherein R is one of the class consisting of alkyl, cycloalkyl, aralkyl, aryl, alkoxyaryl, alkenyl, aralkenyl, and alkynyl groups of at least two carbon atoms and Y is a member of the class consisting of chlorine, bromine, iodine, and a substituent defined by R.

4. A process for preparing a polymer from at least one monomer from the class consisting of acrylonitrile, methacrylonitrile, and esters of acrylic acid and of methacrylic acid and an alcohol, the non-hydroxyl portion of which is free of groups having reactive hydrogen as determined by the Zerewitinoff test which comprises first mixing together under substantially anhydrous conditions and before organo-magnesium compound is introduced a said monomer and a member of the class consisting of boron trifluoride, beryllium chloride, beryllium bromide, beryllium iodide, magnesium chloride, magnesium bromide, magnesium iodide, calcium chloride, calcium bromide, calcium iodide, strontium chloride, strontium bromide, strontium iodide, barium chloride, barium bromide, barium iodide, zinc chloride, zinc bromide, zinc iodide, cadmium chloride, cadmium bromide, cadmium iodide, aluminum chloride, aluminum bromide, and aluminum iodide, the said member being mixed in a proportion of 0.5 to 2.0 moles thereof per mole of said monomer, whereby a preformed complex is formed from said member in said monomer, and then bringing together under substantially anhydrous and anaerobic conditions (1) the monomer containing said preformed complex, (2) an organic solvent inert to organo-magnesium compounds, and (3) 0.01 to 0.05 mole of an organo-magnesium initiator per mole of said monomer, holding the resulting mixture between −80° C. and 0° C. while polymer forms, and separating said polymer, the said organo-magnesium compound being of the formula

wherein R is one of the class consisting of alkyl, cycloalkyl, aralkyl, aryl, alkoxyaryl, alkenyl, aralkenyl, and alkynyl groups of at least two carbon atoms and Y is a member of the class consisting of chlorine, bromine, iodine, and a substituent defined by R.

5. A process for preparing poly(methyl methacrylate) which comprises first mixing together under substantially anhydrous conditions and before organo-magnesium compound is introduced methyl methacrylate and a member of the class consisting of boron trifluoride, beryllium chloride, beryllium bromide, beryllium iodide, magnesium chloride, magnesium bromide, magnesium iodide, calcium chloride, calcium bromide, calcium iodide, strontium chloride, strontium bromide, strontium iodide, barium chloride, barium bromide, barium iodide, zinc chloride, zinc bromide, zinc iodide, cadmium chloride, cadmium bromide, cadmium iodide, aluminum chloride, aluminum bromide, and aluminum iodide, the said member being mixed in a proportion of 0.5 to 2.0 moles thereof per mole of said methyl methacrylate, whereby a preformed complex is formed from said member in said methyl methacrylate, then bringing together under substantially anhydrous and anaerobic conditions at a temperature from −90° C. to 50° C. and in admixture with an organic solvent which is inert to organo-magnesium compounds the methyl methacrylate containing said preformed complex and 0.001 to 0.1 mole of an organo-magnesium compound per mole of said methyl methacrylate, said organo-magnesium compound being of the formula

wherein R is one of the class consisting of alkyl, cycloalkyl, aralkyl, aryl, alkoxyaryl, alkenyl, aralkenyl, and alkynyl groups of at least two carbon atoms and Y is a member of the class consisting of chlorine, bromine, iodine, and a substituent defined by R, whereby polymer is formed.

6. A process according to claim 5 in which the complexing member is magnesium bromide and the organomagnesium compound is diphenylmagnesium.

7. A process for preparing poly(isopropyl methacrylate) which comprises first mixing together under substanially anhydrous conditions and before organo-magnesium compound is introduced isopropyl methacrylate and a member of the class consisting of boron trifluoride, beryllium chloride, beryllium bromide, beryllium iodide, magnesium chloride, magnesium bromide, magnesium iodide, calcium chloride, calcium bromide, calcium iodide, strontium chloride, strontium bromide, strontium iodide, barium chloride, barium bromide, barium iodide, zinc chloride, zinc bromide, zinc iodide, cadmium chloride, cadmium bromide, cadmium iodide, aluminum chloride, aluminum bromide, and aluminum iodide, the said member being mixed in a proportion of 0.5 to 2.0 moles thereof per mole of said isopropyl methacrylate, whereby a preformed complex is formed from said member in said isopropyl methacrylate, then bringing together under substantially anhydrous and anaerobic conditions at a temperature from −90° C. to 50° C. and in admixture with an organic solvent which is inert to organo-magnesium compounds the isopropyl methacrylate containing said preformed complex and 0.001 to 0.1 mole of an organo-magnesium compound per mole of the isopropyl methacrylate, said organo-magnesium compound being of the formula R—Mg—Y wherein R is one of the class consisting of alkyl, cycloalkyl, aralkyl, aryl, alkoxyaryl, alkenyl, aralkenyl, and alkynyl groups of at least two carbon atoms and Y is a member of the class consisting of chlorine, bromine, iodine, and a substituent defined by R.

8. A process according to claim 7 in which the complexing member is magnesium bromide and the organo-magnesium compound is phenylmagnesium bromide.

9. A process for preparing poly(isopropyl acrylate) which comprises first mixing together under substantially anhydrous conditions and before organo-magnesium compound is introduced isopropyl acrylate and a member of the class consisting of boron trifluoride, beryllium chloride, beryllium bromide, beryllium iodide, magnesium chloride, magnesium bromide, magnesium iodide, calcium chloride, calcium bromide, calcium iodide, strontium chloride, strontium bromide, strontium iodide, barium chloride, barium bromide, barium iodide, zinc chloride, zinc bromide, zinc iodide, cadmium chloride, cadmium bromide, cadmium iodide, aluminum chloride, aluminum bromide, and aluminum iodide, the said member being mixed in a proportion of 0.5 to 2.0 moles thereof per mole of said isopropyl acrylate, whereby a preformed complex is formed from said member in said isopropyl acrylate, then bringing together under substantially anhydrous and anaerobic conditions at a temperature from −90° to 50° C. and in admixture with an organic solvent which is inert to organo-magnesium compounds the isopropyl acrylate containing said preformed complex and 0.001 to 0.1 mole of an organo-magnesium compound per mole of the isopropyl acrylate, said organo-magnesium compound being of the formula R—Mg—Y wherein R is one of the class consisting of alkyl, cycloalkyl, aralkyl, aryl, alkoxyaryl, alkenyl, aralkenyl, and alkynyl groups of at least two carbon atoms and Y is a member of the class consisting of chlorine, bromine, iodine, and a substituent defined by R.

10. A process according to claim 9 in which the complexing member is magnesium bromide and the organo-magnesium compound is diphenylmagnesium.

11. A process for preparing poly(tert-butyl acrylate) which comprises first mixing together under substantially anhydrous conditions and before organo-magnesium compound is introduced tert-butyl acrylate and a member of the class consisting of boron trifluoride, beryllium chloride, beryllium bromide, beryllium iodide, magnesium chloride, magnesium bromide, magnesium iodide, calcium chloride, calcium bromide, calcium iodide, strontium chloride, strontium bromide, strontium iodide, barium chloride, barium bromide, barium iodide, zinc chloride, zinc bromide, zinc iodide, cadmium chloride, cadmium bromide, cadmium iodide, aluminum chloride, aluminum bromide, and aluminum iodide, the said member being mixed in a proportion of 0.5 to 2.0 moles thereof per mole of said tert-butyl acrylate whereby a preformed complex is formed from said member in said tert-butyl acrylate, then bringing together under conditions substantially anhydrous and anaerobic at a temperature from −90° C. to 50° C. and in admixture with an organic solvent which is inert to organo-magnesium compounds the tert-butyl acrylate containing said preformed complex and 0.001 to 0.1 mole of an organo-magnesium compound per mole of the tert-butyl acrylate, said organomagnesium compound being of the formula R—Mg—Y wherein R is one of the class consisting of alkyl, cycloalkyl, aralkyl, aryl, alkoxyaryl, alkenyl, aralkenyl, and alkynyl groups of at least two carbon atoms and Y is a member of the class consisting of chlorine, bromine, iodine, and a substituent defined by R.

12. A process according to claim 11 in which the complexing agent is aluminum chloride and the organo-magnesium compound is diphenylmagnesium.

13. A process for preparing poly(cyclohexyl acrylate) which comprises first mixing together under substantially anhydrous conditions and before organo-magnesium compound is introduced cyclohexyl acrylate and a member of the class consisting of boron trifluoride, beryllium chloride, beryllium bromide, beryllium iodide, magnesium chloride, magnesium bromide, magnesium iodide, calcium chloride, calcium bromide, calcium iodide, strontium chloride, strontium bromide, strontium iodide, barium chloride, barium bromide, barium iodide, zinc chloride, zinc bromide, zinc iodide, cadmium chloride, cadmium bromide, cadmium iodide, aluminum chloride, aluminum bromide, and aluminum iodide, the said member being mixed in a proportion of 0.5 to 2.0 moles thereof per mole of said cyclohexyl acrylate, whereby a preformed complex is formed from said member in said cyclohexyl acrylate, then bringing together under substantially anhydrous and anaerobic conditions at a temperature from −90° C. to 50° C. and in admixture with an organic solvent inert to organo-magnesium compounds the monomer containing said preformed complex and 0.001 to 0.1 mole of an organo-magnesium compound per mole of said monomer, said organo-magnesium compound being of the formula R—Mg—Y wherein R is of one of the class consisting of alkyl, cycloalkyl, aralkyl, aryl, alkoxyaryl, alkenyl, aralkenyl, and alkynyl groups of at least two carbon atoms and Y is a member of the class consisting of chlorine, bromine, iodine, and a substituent defined by R.

14. A process according to claim 13 in which the complexing member is magnesium bromide and the organo-magnesium compound is phenylmagnesium bromide.

15. A process for preparing poly(acrylonitrile) which comprises first mixing together under substantially anhydrous conditions and before organo-magnesium compound is introduced acrylonitrile and a member of the class consisting of boron trifluoride, beryllium chloride, beryllium bromide, beryllium iodide, magnesium chloride, magnesium bromide, magnesium iodide, calcium chloride, calcium bromide, calcium iodide, strontium chloride, strontium bromide, strontium iodide, barium chloride, barium bromide, barium iodide, zinc chloride, zinc bromide, zinc iodide, cadmium chloride, cadmium bromide, cadmium iodide, aluminum chloride, aluminum bromide, and aluminum iodide, the said member being mixed in a proportion of 0.5 to 2.0 moles thereof per mole of said acrylonitrile, whereby a preformed complex is formed from said member in said acrylonitrile, then bringing together under substantially anhydrous and anaerobic conditions at a temperature from −90° C. to 50° C. and in admixture with an organic solvent which is inert to organo-magnesium compounds the acrylonitrile containing said preformed complex and 0.001 to 0.1 mole of an organo-magnesium compound being of the formula

R—Mg—Y wherein R is one of the class consisting of alkyl, cycloalkyl, aralkyl, aryl, alkoxyaryl, alkenyl, aralkenyl, and alkynyl groups of at least two carbon atoms and Y is a member of the class consisting of chlorine, bromine, iodine, and a substituent defined by R.

References Cited in the file of this patent

UNITED STATES PATENTS

| | | |
|---|---|---|
| 2,687,395 | Marks | Aug. 24, 1954 |
| 2,846,427 | Findlay | Aug. 5, 1958 |
| 2,899,415 | Truett | Aug. 11, 1959 |
| 2,910,461 | Nowlin et al. | Oct. 27, 1959 |

FOREIGN PATENTS

| | | |
|---|---|---|
| 566,713 | Belgium | Apr. 30, 1958 |

OTHER REFERENCES

Beaman: Journ. Amer. Chem. Soc., vol. 70, pages 3115–3118 (1948).

Landler: Recueil des Travaux des Pays-Bas, vol. 68, pages 992–998 (1949).

Schildknecht: "Polymer Processes," vol. 10 of High Polymer Series, published 1956, by Interscience Publishers, page 221.